(12) United States Patent
McIntosh et al.

(10) Patent No.: US 12,030,637 B2
(45) Date of Patent: Jul. 9, 2024

(54) SYSTEM AND METHOD FOR TRANSFERRING INDIVIDUALS TO AND FROM A TOILET OF A LAVATORY

(71) Applicant: THE BOEING COMPANY, Chicago, IL (US)

(72) Inventors: Darren Carl McIntosh, Mukilteo, WA (US); Timothy Richard Randall, Seattle, WA (US)

(73) Assignee: The Boeing Company, Chicago, IL (US)

( * ) Notice: Subject to any disclaimer, the term of this patent is extended or adjusted under 35 U.S.C. 154(b) by 215 days.

(21) Appl. No.: 17/732,738

(22) Filed: Apr. 29, 2022

(65) Prior Publication Data

US 2023/0002055 A1 Jan. 5, 2023

Related U.S. Application Data

(60) Provisional application No. 63/216,563, filed on Jun. 30, 2021.

(51) Int. Cl.
*A61G 5/00* (2006.01)
*A61G 5/10* (2006.01)
*B64D 11/02* (2006.01)

(52) U.S. Cl.
CPC ............ *B64D 11/02* (2013.01); *A61G 5/1002* (2013.01)

(58) Field of Classification Search
CPC ................ A61G 5/1002; A61G 7/1046; A61G 2200/34; A61G 7/1007; A61G 2203/20; A61G 2203/30; A61G 2203/34; A61G 2203/44; A61G 2205/10; A61G 2205/60; A61G 5/08; A61G 5/0816; A61G 5/0891; A61G 5/1045; A61G 5/1054; A61G 5/107; A61G 5/1091; A61G 5/128; A61G 5/14; A61G 7/02; A61G 7/053; A61G 7/10; A61G 7/1003; A61G 7/1019; A61G 7/1034; A61G 7/1059; A61G 7/1065; A61G 7/108; A61G 7/1098; Y10S 297/04; A47K 17/02; A47K 11/04; B64D 11/02
USPC ....................................... 280/47.38
See application file for complete search history.

(56) References Cited

U.S. PATENT DOCUMENTS

| | | | | |
|---|---|---|---|---|
| 2,592,405 A * | 4/1952 | Everest | ..................... | A61G 5/08 4/480 |
| 4,266,305 A * | 5/1981 | Kavaloski | ............ | A61G 7/1046 4/479 |
| 5,725,275 A * | 3/1998 | Wigfall | ................ | A61G 5/1002 297/183.1 |

(Continued)

*Primary Examiner* — James A Shriver, II
*Assistant Examiner* — Hilary L Johns
(74) *Attorney, Agent, or Firm* — Joseph M. Butscher; The Small Patent Law Group LLC (57) ABSTRACT

A system configured to transfer an individual between an area and a toilet within a lavatory includes a base, one or more rollers coupled to the base, and a seating assembly coupled to the base. The seating assembly includes a backrest, a toilet overlay seat configured to be disposed over the toilet, and a seat cover that is movable between a covering position over the toilet overlay seat, and a lavatory use position in which the toilet overlay seat is exposed. A counterbalance is coupled to one or both of the base or the seating assembly. The counterbalance is moveable between a stowed position and a deployed position in relation to the toilet.

20 Claims, 10 Drawing Sheets

(56) References Cited

U.S. PATENT DOCUMENTS

| | | | | |
|---|---|---|---|---|
| 5,926,859 | A * | 7/1999 | Kimura | A47K 17/02 4/254 |
| 6,101,646 | A * | 8/2000 | Son | A61G 7/02 5/604 |
| 6,185,759 | B1 * | 2/2001 | Staudenmayer | A47K 17/026 4/663 |
| 6,418,571 | B1 * | 7/2002 | Cheng | A61G 5/1002 297/188.09 |
| 6,547,265 | B1 * | 4/2003 | Enge | A61G 7/053 280/47.38 |
| 7,686,319 | B1 * | 3/2010 | Fink | A61G 5/107 5/81.1 HS |
| 8,528,127 | B1 * | 9/2013 | Gabaldon | A61G 7/1007 4/480 |
| 10,660,811 | B2 * | 5/2020 | Dougherty | A61G 5/14 |
| 11,013,649 | B2 * | 5/2021 | Sonoda | A61G 5/1002 |
| 11,571,093 | B2 * | 2/2023 | McIntosh | B64D 11/02 |
| 11,596,564 | B2 * | 3/2023 | Smith | A47K 3/122 |
| 2001/0010099 | A1 * | 8/2001 | Shero | A47K 11/04 4/480 |
| 2010/0219668 | A1 * | 9/2010 | Nelson | A61G 5/14 4/479 |
| 2013/0318702 | A1 * | 12/2013 | Delaney | A47K 11/02 4/483 |
| 2018/0271335 | A1 * | 9/2018 | Hart | A61G 5/1002 |
| 2020/0268588 | A1 * | 8/2020 | Desmarais | A61G 7/1049 |
| 2021/0186785 | A1 * | 6/2021 | Smith | A61G 7/1019 |

* cited by examiner

SYSTEM AND METHOD FOR TRANSFERRING INDIVIDUALS TO AND FROM A TOILET OF A LAVATORY

CROSS-REFERENCE TO RELATED APPLICATION

This application is a non-provisional application of U.S. Patent Application No. 63/216,563, filed Jun. 30, 2021, and the entire disclosure of which is incorporated herein by reference.

FIELD OF THE DISCLOSURE

Embodiments of the present disclosure generally relate to a system and method for transferring individuals to and from a toilet of a lavatory, such as within a commercial aircraft.

BACKGROUND OF THE DISCLOSURE

Commercial aircraft are used to transport passengers between various locations. A typical commercial aircraft includes one or more lavatories within an internal cabin.

Space within a commercial aircraft is limited. Notably, a lavatory within a commercial aircraft is typically relatively small. A larger lavatory would necessarily occupy more space within a commercial aircraft, and may prevent additional passenger seating within an internal cabin. Aircraft operators typically prefer to have additional passenger seating within an internal cabin, as the additional passenger seating leads to increased revenues.

Persons of reduced mobility (such as individuals having disabilities, injuries, or a reduced ability to move) who use wheelchairs may use a separate board to transfer from a wheelchair to a toilet. The board is typically a separate and distinct device. However, such a separate and distinct board may be lost. Further, individuals may opt not to use the board due to the extra steps of retrieving the board and positioning it between a wheelchair and a toilet, particularly within the confined space of a lavatory of an aircraft. Further, during use, a wheelchair may inadvertently move, thereby causing the board to shift or fall, which may cause discomfort or even injury to the individual.

As another example, aisle transfer seats having wheels can be used to transfer a person of reduced mobility from a passenger seating area to a lavatory. Typically, the individual transfers from a seat within the internal cabin to the aisle transfer seat, then maneuver down an aisle to a specially designed, large or convertible lavatory for persons of reduced mobility. Such specially designed and/or convertible lavatories are large in footprint to provide space within the lavatory to allow the person of reduced mobility sufficient room to maneuver and transfer off the aisle transfer seat to the toilet.

SUMMARY OF THE DISCLOSURE

A need exists for a system and method for allowing individuals to independently more easily and efficiently use an existing lavatory, such as within an internal cabin of a commercial aircraft. Further, a need exists for a safe, readily accessible, consistent, independent, and easy-to-use system and method for transferring between different areas within a lavatory.

With those needs in mind, certain embodiments of the present disclosure provide a system configured to transfer an individual between an area and a toilet within a lavatory. The system includes a base, one or more rollers coupled to the base, and a seating assembly coupled to the base. The seating assembly includes a backrest, a toilet overlay seat configured to be disposed over the toilet, and a seat cover that is movable between a covering position over the toilet overlay seat, and a lavatory use position in which the toilet overlay seat is exposed. A counterbalance is coupled to one or both of the base or the seating assembly. The counterbalance is moveable between a stowed position and a deployed position in relation to the toilet.

In at least one embodiment, the seating assembly is configured to move relative to the base. For example, the seating assembly is configured to rearwardly slide relative to the base over the toilet.

In at least one embodiment, the base includes lateral guide rails that slidably retain one or more portions of the seating assembly.

In at least one embodiment, the system also includes a handle operatively coupled to the counterbalance. The handle is configured to be engaged to move the counterbalance between the stowed position and the deployed position.

As a further example, the handle couples to the counterbalance through a ratchet mechanism. In a further example, the handle includes a release button operatively coupled to the ratchet mechanism, and configured to release the ratchet mechanism from a locked position.

In at least one embodiment, the system also includes a latch configured to be selectively engaged to selectively lock and unlock the seating assembly in translated positions.

As an example, the counterbalance includes a first extension beam connected to a second connection beam by a cross beam.

In at least one embodiment, at least a portion of the base is configured to magnetically couple to a portion of the lavatory.

In at least one embodiment, the base includes one or more suction cups configured to secure the transfer system in position within the lavatory.

Certain embodiments of the present disclosure provide a method for transferring an individual between an area and a toilet within a lavatory. The method includes coupling a counterbalance to one or both of a base or a seating assembly, wherein the seating assembly is coupled to the base, wherein the seating assembly comprises a backrest, a toilet overlay seat configured to be disposed over the toilet, and a seat cover that is movable between a covering position over the toilet overlay seat, and a lavatory use position in which the toilet overlay seat is exposed; and moving the counterbalance between a stowed position and a deployed position in relation to the toilet.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide systems and methods for transferring to a toilet within a lavatory, such as within an internal cabin of an aircraft. The systems and methods described herein allows an individual to stay on a seating assembly throughout a duration of use of a lavatory, thereby reducing a potential of falling within the lavatory, while transferring to and from the toilet. Further, the systems and methods described herein allow current and future standard lavatories to be used by a person of reduced mobility. Accordingly, there is no need for specially configured lavatories. Embodiments of the present disclosure provide persons of reduced mobility with more lavatory and airplane use options. Further, embodiments of the present disclosure minimize or otherwise reduce the need for specially designed, large, and/or convertible lavatories for persons of reduced mobility.

Certain embodiments of the present disclosure provide a transfer system that allows a person of reduced mobility to independently use any type of aircraft (or other) lavatory, without having to transfer within the lavatory from the transfer seat to the toilet. In at least one embodiment, the transfer system includes a fold down seat cover allowing the system to be used as a transfer seat in a first configuration (no visible opening in seat base). A handle is operatively coupled to a counterbalance, which can be behind a seat back, for example. The counterbalance in a deployed position provides a brace that is configured to engage a toilet, such as a top surface of a seat at a back of the toilet. The transfer system is further configured to slide backwards over the toilet, while the counterbalance in the deployed position prevents the transfer system from tipping rearwardly as the transfer system is moved back over the toilet.

In at least one embodiment, a ratchet mechanism assists the counterbalance in engaging toilets of different heights. Further, the transfer system can include a release button that disengages the counterbalance from a locked state, thereby allowing the counterbalance to be rotated back to a stowed position.

In at least one embodiment, a latch (such as located in a forward position) is configured to be pulled allowing a seating assembly to slide completely backwards over the toilet. When pushed back, the latch is released locking the slide in this position. The latch allows the sliding portion to be locked at different positions.

In at least one embodiment, a magnetic system can be used to lock the transfer system in position in relation to a toilet. For example, an electromagnet can be disposed in the floor of the lavatory at a position that is configured to locate the transfer system to the toilet. The transfer system can have one or more magnetic plates (such as formed of a ferromagnetic material, such as iron) that are attracted to the electromagnet when activated (such as via a switch), thereby locking the transfer system in position. In at least one embodiment, a lever arm can move the metallic plate(s) relative to the magnet. An individual can operate the switch (such as via a button) to engage the magnetic lock and push the button again to release.

As another example, the transfer system can include one or more suction cups that are configured to align with smooth surface pads within the lavatory. Easy to access levers can be coupled to the suction cups and allow them to be moved between stowed and deployed positions. As another example, latches or slide bolts can be fitted to the transfer system to lock it in position in relation to a toilet.

Figure 1:
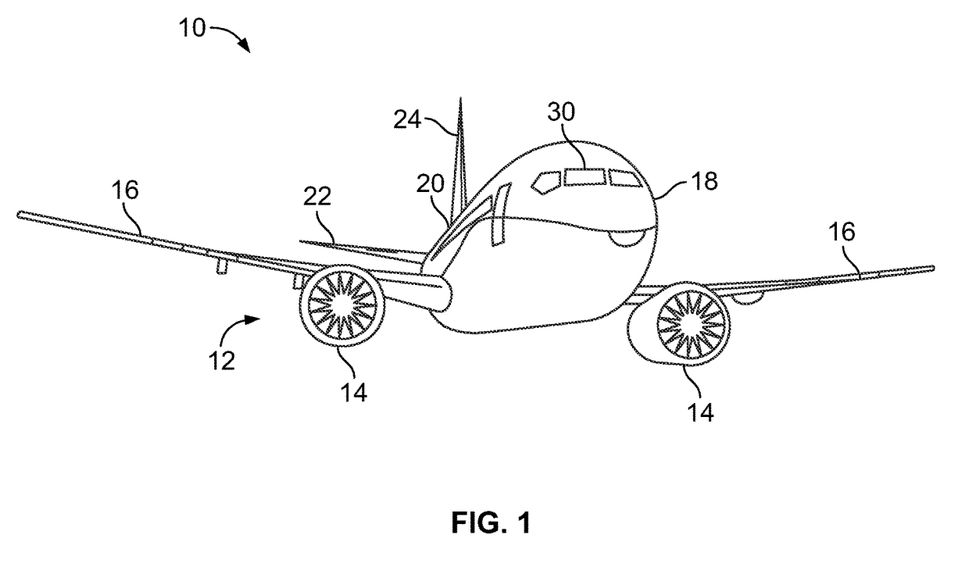
FIG. 1 illustrates a perspective front view of an aircraft, according to an embodiment of the present disclosure.

FIG. 1 illustrates a perspective front view of an aircraft 10, according to an embodiment of the present disclosure. The aircraft 10 includes a propulsion system 12 that includes engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin 30, which includes a flight deck or cockpit, one or more work sections (for example, galleys, personnel carry-on baggage areas, and the like), one or more passenger sections (for example, first class, business class, and coach sections), one or more lavatories, and/or the like.

Alternatively, instead of an aircraft, embodiments of the present disclosure may be used with various other vehicles, such as automobiles, buses, locomotives and train cars, watercraft, and the like. Further, embodiments of the present disclosure may be used with respect to fixed structures, such as commercial and residential buildings.

Figure 2:
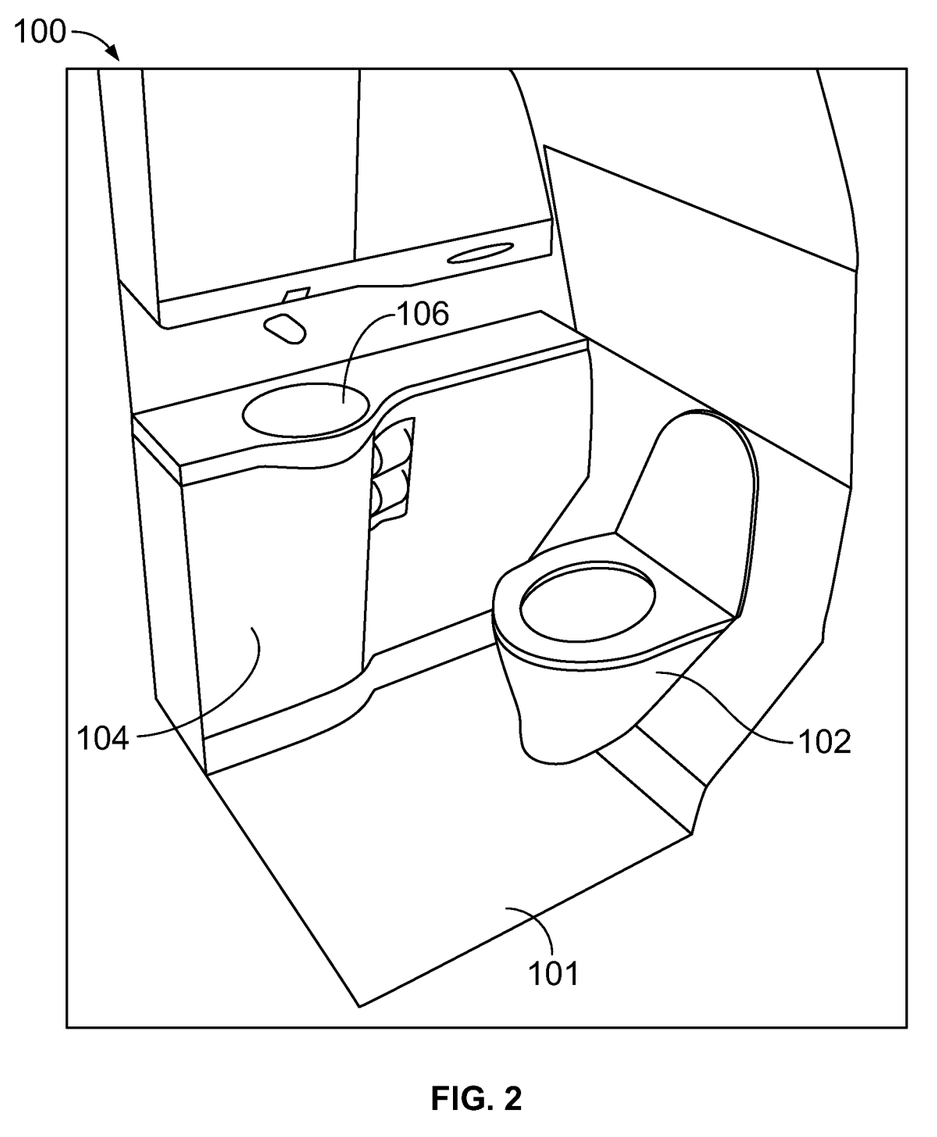
FIG. 2 illustrates a perspective internal view of a lavatory, according to an embodiment of the present disclosure.

FIG. 2 illustrates a perspective internal view of a lavatory 100, according to an embodiment of the present disclosure. The lavatory 100 is an example of an enclosed space or chamber, such as within the internal cabin of the aircraft 10, shown in FIG. 1. The lavatory 100 may be onboard an aircraft, as described above. Optionally, the lavatory 100 may be onboard various other vehicles. In other embodiments, the lavatory 100 may be within a fixed structure, such as a commercial or residential building. The lavatory 100 includes a floor 101 that supports a toilet 102, cabinets 104, and a sink 106 or wash basin. The lavatory 100 may be arranged differently than shown. The lavatory 100 may include more or less components than shown.

Figure 3:
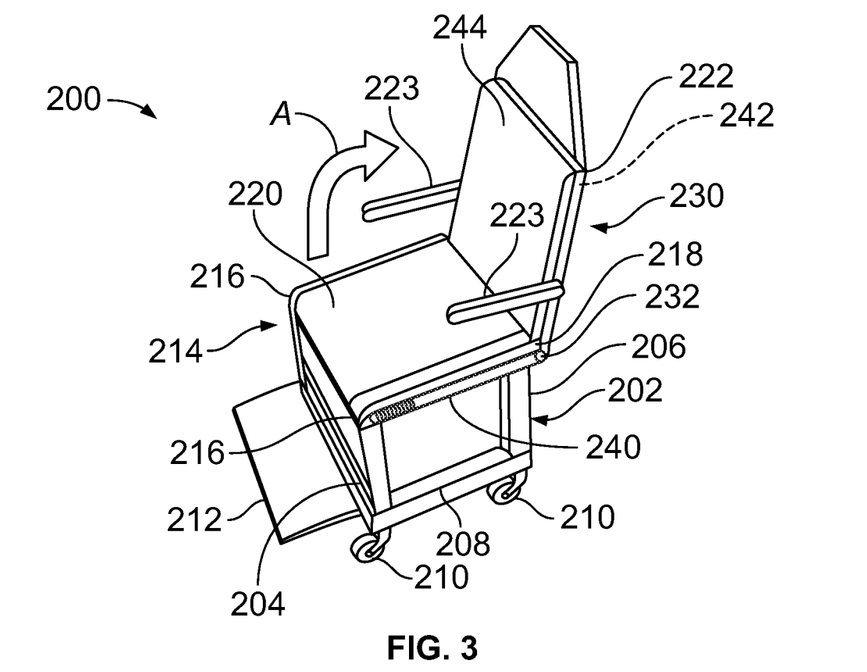
FIG. 3 illustrates a perspective top view of a transfer system configured to transfer an individual over a toilet, according to an embodiment of the present disclosure.

FIG. 3 illustrates a perspective top view of a transfer system 200 configured to transfer an individual over a toilet (such as the toilet 102 shown in FIG. 2), according to an embodiment of the present disclosure. The transfer system 200 includes a base 202, which can include a forward support 204 and an aft support 206, which can be connected by one or more cross supports 208, such as beams. The forward support 204 can include one or more legs, panels, beams, or the like. Similarly, the aft support 206 can include one or more legs, panels, beams, and/or the like.

One or more rollers 210 (such as caster, wheels, balls, or the like) extend downwardly from the base 202 and are configured to provide rolling support for the transfer system 200 on a floor. As shown, the transfer system 200 can include four rollers 210, such as at or otherwise proximate to four lower corners.

A footrest 212 extends forwardly from the forward support 204. The footrest 212 is configured to provide a support surface for feet of an individual seated on the transfer system 200. Optionally, the transfer system 200 may not include the footrest 212.

A seating assembly 214 is supported on the base 202. The base 202 and/or the seating assembly 214 includes lateral guide rails 216 that slidably retain a portion of the seating assembly 214, as lateral edges of a toilet overlay seat 218. A seat cover 220 is disposed over the toilet overlay seat 218. As shown in FIG. 3, the seat cover 220 is in a covering position, in which the seat cover 220 is positioned over and covers the toilet overlay seat 218. In the covering position, the seat cover 220 conceals an opening of the toilet overlay seat 218, and allows an individual to sit on the seat cover 220 and the transfer system 200 can be maneuvered from a first area (such as a passenger seating area) to a second area (such as a lavatory). In at least one embodiment, the seat cover 220 also allows the transfer of an individual from a wheelchair (such as at a gate of a terminal of an airport) to a passenger seat within an aircraft.

The seating assembly 214 also includes a backrest 222 coupled to the toilet overlay seat 218 and the seat cover 220. One or more armrests 223 can be coupled to the lateral portions of the backrest 222, for example. One or both of the armrests 223 can be upwardly folded to assist in unimpeded transfer.

A counterbalance 230 is pivotally coupled to the seating assembly 214, such as at pivot couplings 232 (for example, hinges, rotatable bearings, axles, and/or the like) coupled to the seating assembly 214, such as at rear portions of the toilet overlay seat 218, and/or lower portions of the backrest 222. The counterbalance 230 is also operatively coupled to a handle 240, such as on a side of seating assembly 214.

As shown in FIG. 3, the counterbalance 230 is in a stowed position, in which the counterbalance is vertically oriented, and can be against a rear surface 242 of the backrest 222. In the stowed position, the handle 240 can be to a side of the toilet overlay seat 218.

When an individual is to use the lavatory, the seat cover 220 is rotated upwardly into a lavatory use position in the direction of arc A about a coupling axis at a rear of the seating assembly 214 against a front surface 244 of the backrest 222.

Figure 4:
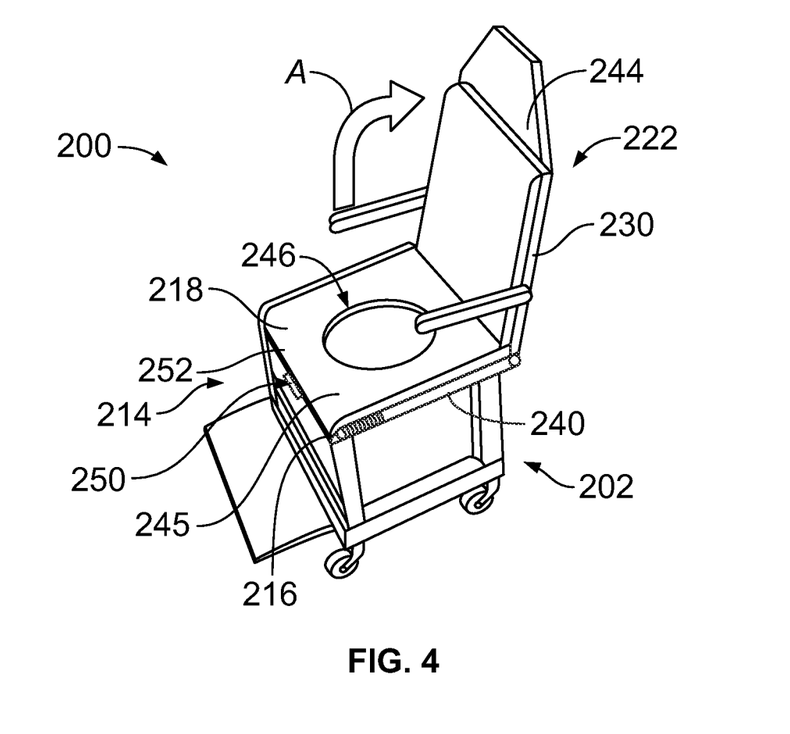
FIG. 4 illustrates a perspective top view of the transfer system of FIG. 3 having a seat cover in a lavatory use position.

FIG. 4 illustrates a perspective top view of the transfer system 200 of FIG. 3 having the seat cover 220 in a lavatory use position. The seat cover 220 has been rotated in the direction of arc A against the front surface 244 of the backrest 222. In the lavatory use position, the seat cover 220 no longer covers the toilet seat overlay 218. As such, the toilet seat overlay 218 is exposed. The toilet seat overlay 218 includes an outer seating frame 245 defining an opening 246, which is configured to be positioned over an opening in a toilet seat. As explained herein, the seating assembly 214 is configured to slide rearwardly relative to the base 202 along and through the lateral guide rails 216 to move the toilet seat overlay 218 over the toilet seat.

A latch 250 can be located on the toilet seat overlay 218 at a forward edge 252. The latch 250 is operatively coupled to the seating assembly 214 (such as the toilet seat overlay 218) and the lateral guide rails 216. The latch 250 is configured to be selectively engaged by an individual (such as an individual seated on the seating assembly 214) to selectively lock and unlock the seating assembly 214 in translated positions, such as to lock the seating assembly 214 in a rearwardly slid position.

Figure 5:
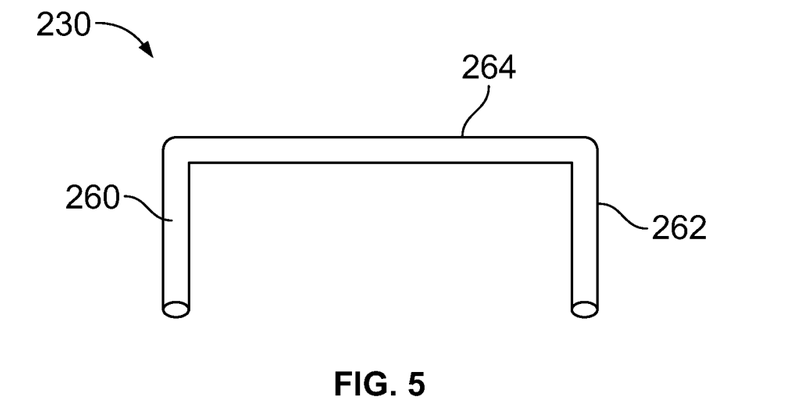
FIG. 5 illustrates a counterbalance, according to an embodiment of the present disclosure.

FIG. 5 illustrates a counterbalance, according to an embodiment of the present disclosure. The counterbalance 230 includes a first extension beam 260 connected to a second extension beam 262 by a crossbeam 264. The first extension beam 260 and the second extension beam 262 are pivotally coupled to the pivot couplings 232 (shown in FIG. 3) at opposite sides of the seating assembly 214. Optionally, the counterbalance 230 can include only one extension beam. As another example, the counterbalance 230 can include one or more extension beams and no cross beam.

Figure 6:
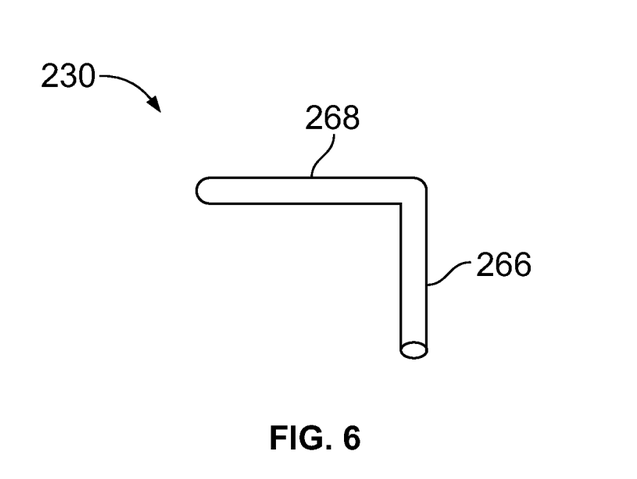
FIG. 6 illustrates a counterbalance, according to an embodiment of the present disclosure.

FIG. 6 illustrates a counterbalance 230, according to an embodiment of the present disclosure. In this embodiment, the counterbalance 230 includes an extension beam 266 connected to a cross beam 268.

Figure 7:
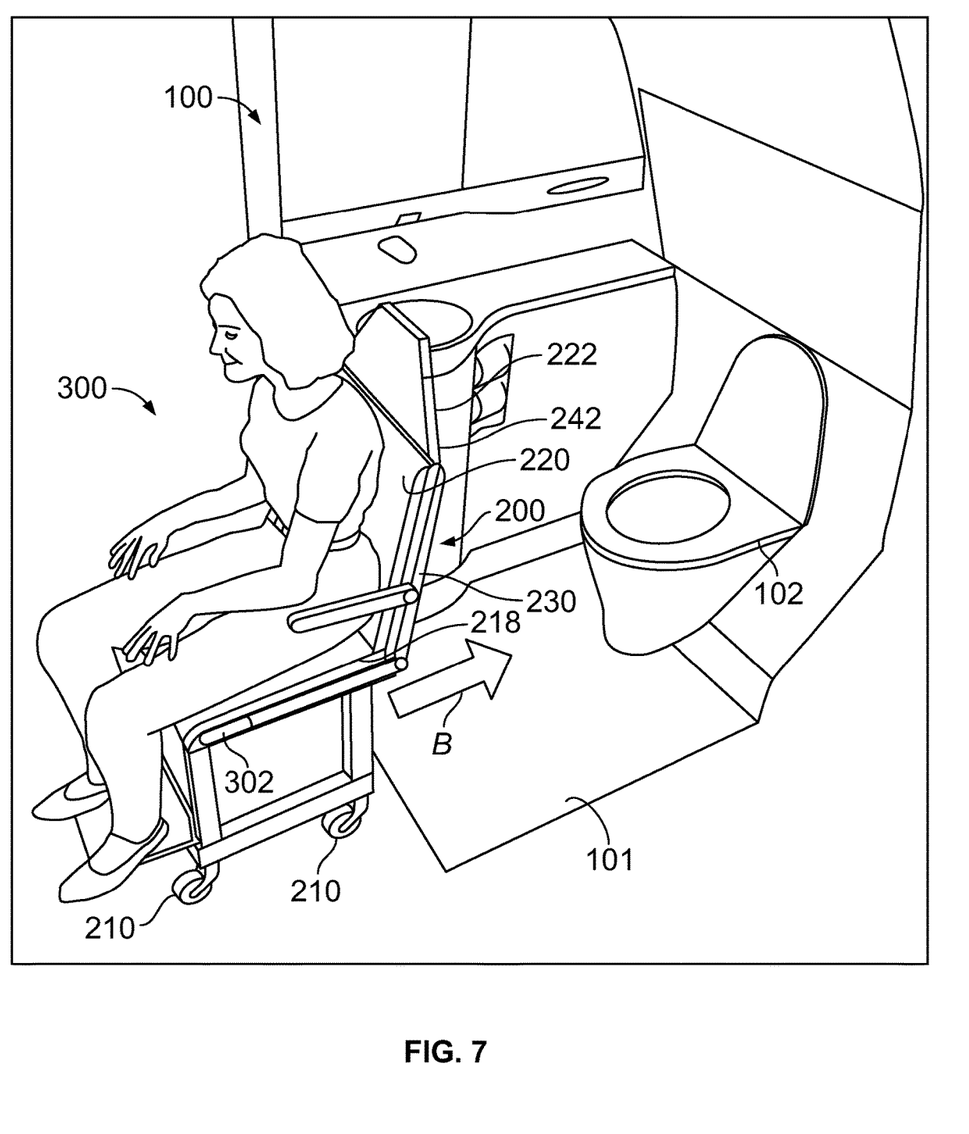
FIG. 7 illustrates a perspective interior view of the lavatory having the transfer system away from the toilet, according to an embodiment of the present disclosure.

FIG. 7 illustrates a perspective interior view of the lavatory having the transfer system 200 away from the toilet 102, according to an embodiment of the present disclosure. Referring to FIGS. 2-7, as noted, an individual 300 is seated on the on the transfer system 200 and maneuvers to the lavatory 100, such as by the transfer system 200 rolling through an aisle of an internal cabin. Before transferring to the transfer seat system 200, the seat cover 220 is moved into the lavatory use position (as shown in FIG. 4), and the individual sits on the toilet overlay seat 218. In this position, the rear surface 242 faces toward the toilet 102, and the individual 300 then moves the transfer system 200 rearwardly toward the toilet 102 in the direction of arrow B, such as via the rollers 210 rolling over the floor 101.

As shown in FIG. 7, the counterbalance 230 is in a stowed position. In the stowed position, the counterbalance 230 can have at least a portion that is against the rear surface 242 of the backrest 222.

The rollers 210 can be coupled to brakes. The individual 300 can engage the brakes to ensure that the transfer system 200 does not undesirably roll.

Figure 8:
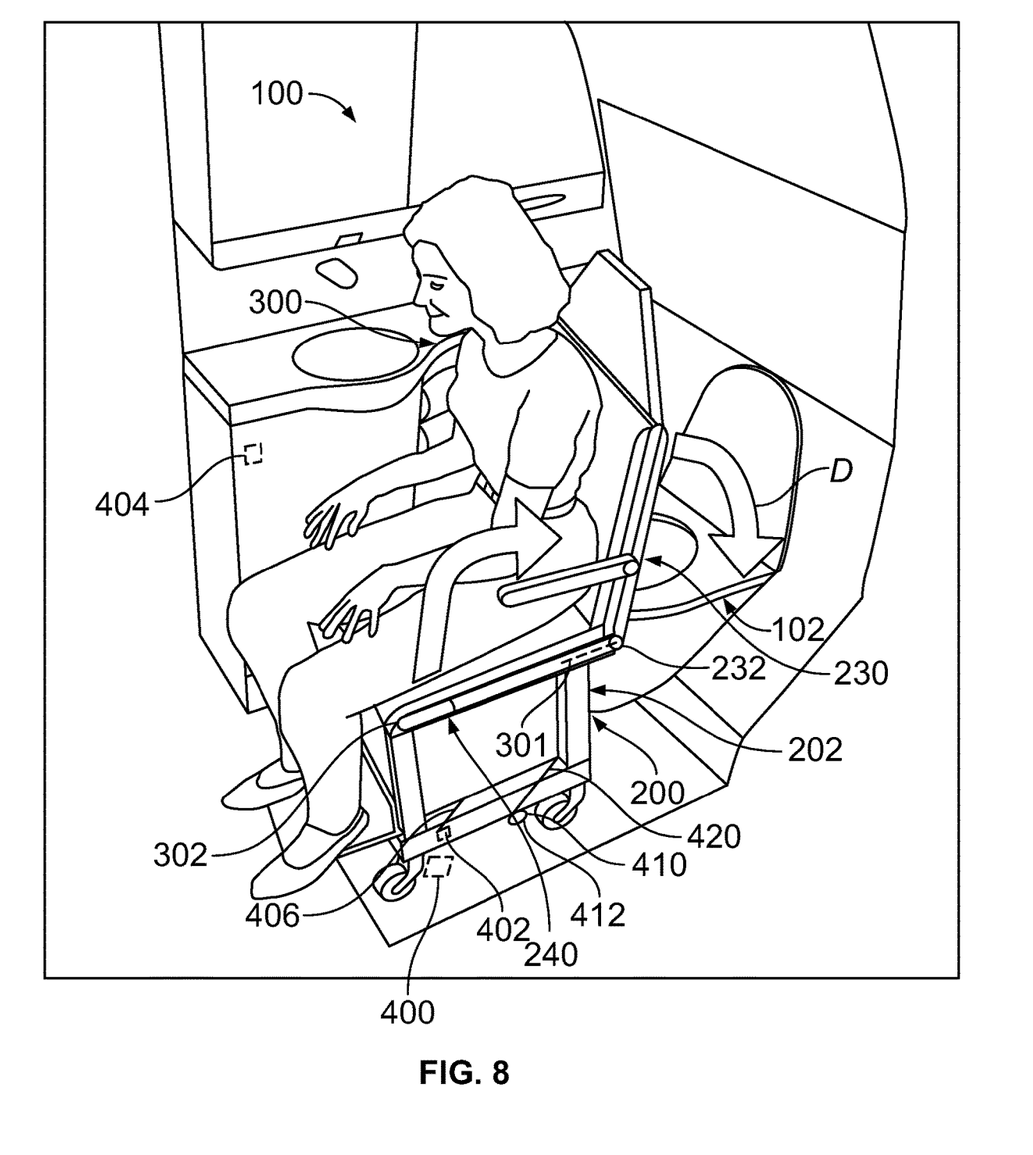
FIG. 8 illustrates a perspective interior view of the lavatory having the transfer system proximate to the toilet, according to an embodiment of the present disclosure.

FIG. 8 illustrates a perspective interior view of the lavatory 100 having the transfer system 200 proximate to the toilet 102, according to an embodiment of the present disclosure. When the transfer system abuts against a portion of the toilet 102 (such as a portion of the base 202 abutting against the toilet 102), the individual 300 grasps the handle 240 and pulls upwardly in the direction of arc C to pivot the handle 240 and the counterbalance 230 about the pivot coupling(s) 232 to move the counterbalance toward and into a deployed position. As such, the handle 240 pivots upwardly in the direction of arc C, while the counterbalance 230 pivots downwardly in the direction of arc D.

In at least one embodiment, the handle 240 couples to the counterbalance 230 through a ratchet mechanism 301 that locks the counterbalance 230 in successive locations. The ratchet mechanism 301 prevents the counterbalance 230 from undesirably rotating upwardly opposite to the direction of arc D. The ratchet mechanism 301 allows the counterbalance 230 to adapt to a size, shape, and height of the toilet 102. A release button 302 can be on the handle 240. The release button 302 is operatively coupled to the ratchet mechanism 301 and configured to release the ratchet mechanism 301 from a locked position, so that the handle 240 and the counterbalance 230 can be rotated back to the stowed position. Optionally, the transfer system 200 may not include the ratchet mechanism 301 or the release button 302.

Figure 9:
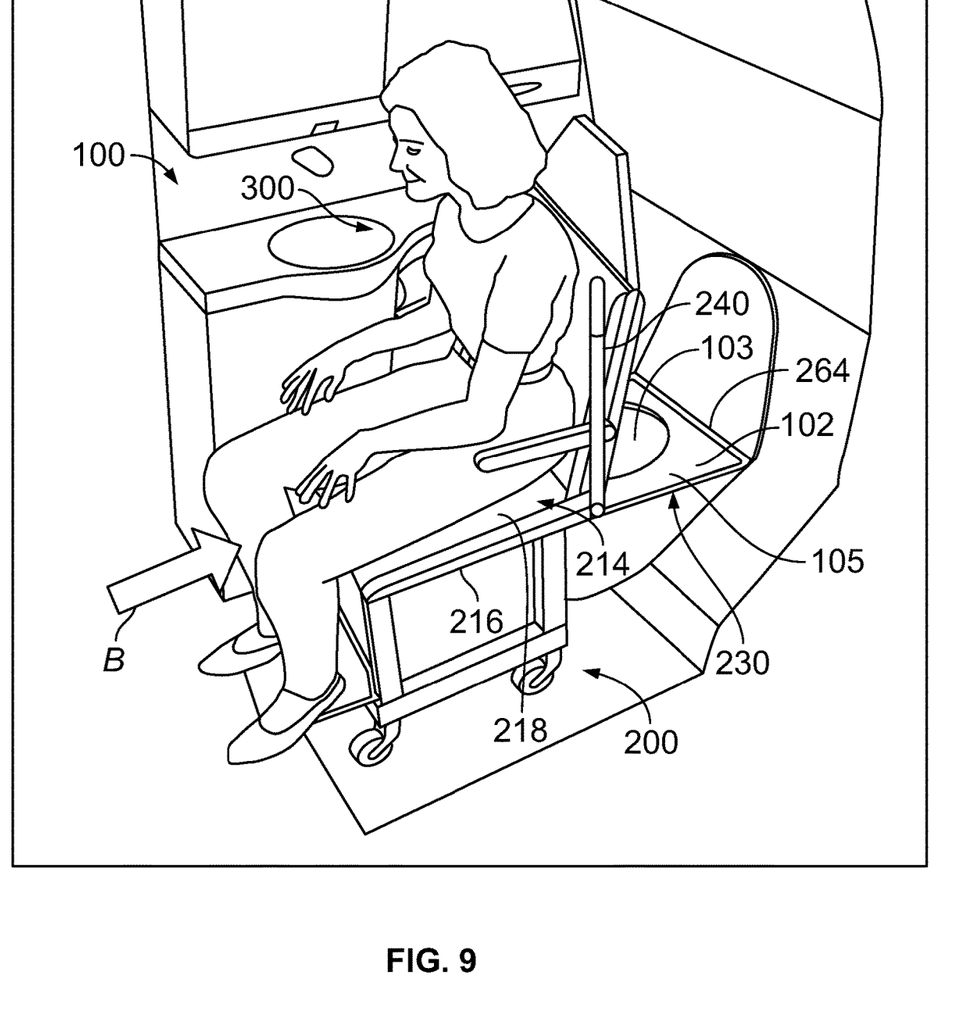
FIG. 9 illustrates a perspective interior view of the lavatory having the transfer system with a counterbalance in a deployed position, according to an embodiment of the present disclosure.

FIG. 9 illustrates a perspective interior view of the lavatory 100 having the transfer system 200 with the counterbalance 230 in a deployed position, according to an embodiment of the present disclosure. In the deployed position, the crossbeam 264 of the counterbalance 230 abuts against a rear portion of the toilet 102 and/or a wall portion behind the opening 103 of the toilet seat 105. In this manner, the counterbalance 230 provides a secure brace that prevents the transfer system 200 from rearwardly tipping as the individual shifts the seating assembly over the toilet 105. For example, the individual 300 engages the latch 250 to release the seating assembly 214 from a locked position in relation to the rails 216. The individual 300 then slides the seating assembly 214 rearwardly in the direction of arrow B so that the toilet overlay seat 218 is over the toilet seat 105, while the counterbalance 230, braced against the toilet 102 and/or a wall portion, prevents the transfer assembly 200 from tipping over.

Figure 10:
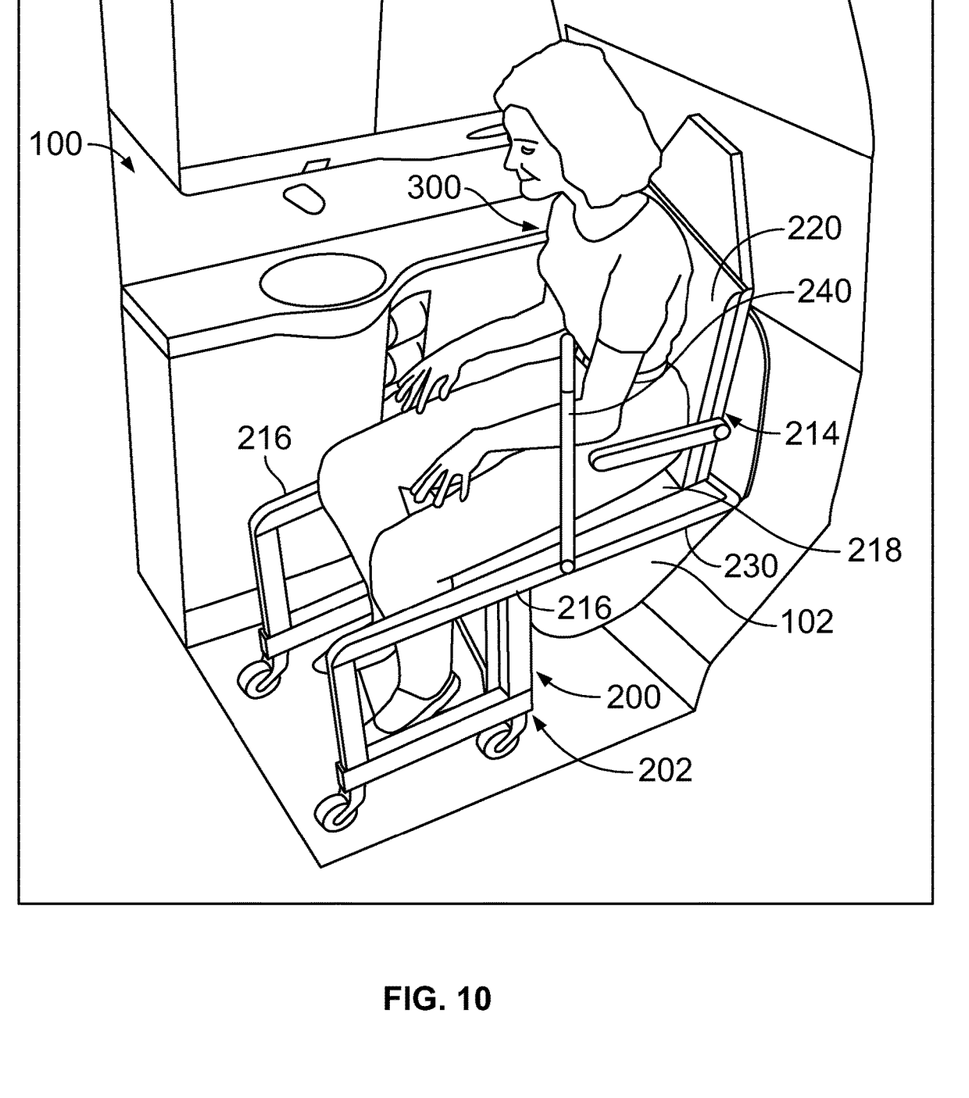
FIG. 10 illustrates a perspective interior view of the lavatory having the transfer system with a seating assembly in a lavatory use position, according to an embodiment of the present disclosure.

FIG. 10 illustrates a perspective interior view of the lavatory 100 having the transfer system 200 with the seating assembly 214 in a lavatory use position, according to an embodiment of the present disclosure. In the lavatory use position, the counterbalance 230 is in the deployed position, and the seating assembly 214 is slid over the toilet 102, such that the opening 246 (shown in FIG. 4) of the toilet overlay seat 218 is positioned over the opening 103 (shown in FIG. 9) of the toilet 102.

After the individual 300 is finished using the toilet 102, the seating assembly 214 is moved back over the base 202, the counterbalance 230 is moved back to the stowed position, and the seat cover 220 is pivoted back over the toilet overlay seat 218. The individual 300 may then sit on the seat cover 220 and maneuver the transfer system 200 out of the lavatory 100.

Referring again to FIG. 8, in at least one embodiment, the transfer system 200 may be configured to magnetically couple to a portion of the lavatory 100 to secure the transfer system 200 in position. For example, a magnetic system can be used to lock the transfer system 200 in position in relation to the toilet 102. For example, an electromagnet 400 can be disposed in the floor of the lavatory at a position that is configured to locate the transfer system 200 to the toilet 102. The transfer system can have one or more magnetic plates 402 (such as formed of a ferromagnetic material, such as iron) that are attracted to the electromagnet 400 when activated (such as via a switch 404), thereby locking the transfer system 200 in position. In at least one embodiment, a lever arm 406 can move the metallic plate(s) 402 relative to the electromagnet 400 in order to selectively secure and release the magnetic coupling therebetween. An individual can operate the switch 404 (such as via a button) to engage the magnetic lock and push the button again to release. Optionally, the transfer system 200 may not include the metallic plate(s), and the lavatory 100 may not include the electromagnet 300 or the switch 404.

As another example, at least a portion of the base 202 (such as a bottom portion, a rear portion, a lateral portion, and/or the like) includes one or more suction cups configured to secure the transfer system 200 in position within the lavatory 100. For example, the transfer system can include one or more suction cups 410 that are configured to align with smooth surface pads 412 within the lavatory 100. Levers 420 can be coupled to the suction cups 410 and allow them to be moved between stowed and deployed positions. Optionally, the transfer system 200 may not include the suction cups. As another example, latches or slide bolts can be fitted to the transfer system 200 to lock it in position in relation to the toilet 102. As another example, one or more straps can be used to secure the transfer system 200 in position within the lavatory 100.

Figure 11:
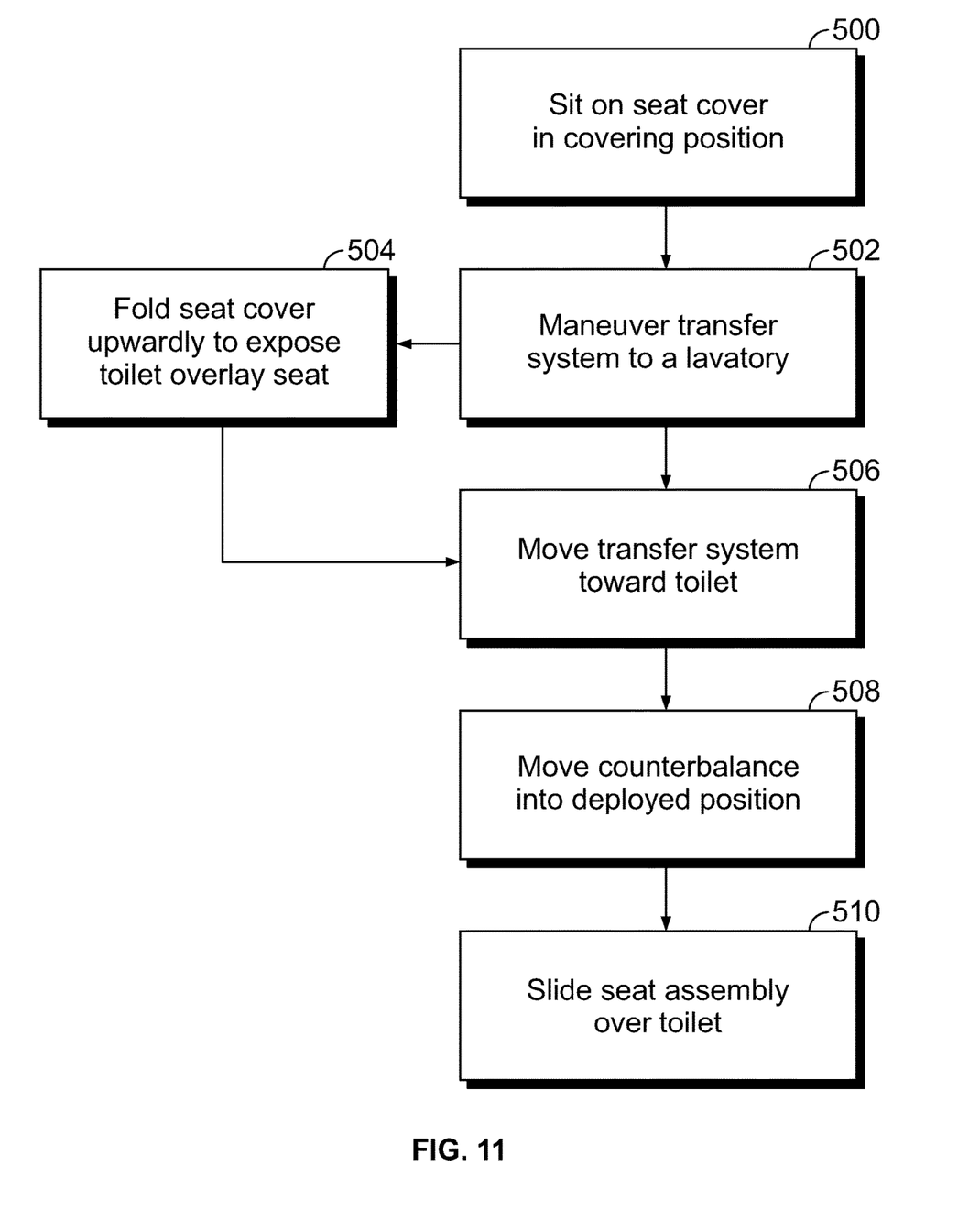
FIG. 11 illustrates a flow chart of a transfer method, according to an embodiment of the present disclosure.

FIG. 11 illustrates a flow chart of a transfer method, according to an embodiment of the present disclosure. Referring to FIGS. 2-11, at 500, the individual 300 sits on the seat cover 220 in the covering position (as shown in FIG. 3). At 502, the transfer system 200 is then maneuvered to the lavatory 100 via the rollers 210, for example.

Before entering the lavatory 100, at 504, the seat cover 220 is folded upwardly to expose the toilet overlay seat 218, as shown in FIG. 4. The individual 300 then sits on the toilet overlay seat 218.

At 506, the transfer system 200 is then moved toward the toilet 506, as shown in FIGS. 7 and 8. At 508, the counterbalance 230 is moved into the deployed position, as shown in FIG. 9. At 510, the seating assembly 214 is then slid back over the toilet 102, as shown in FIG. 10. After the individual 300 is finished using the toilet 102, the process is reversed.

Figure 12:
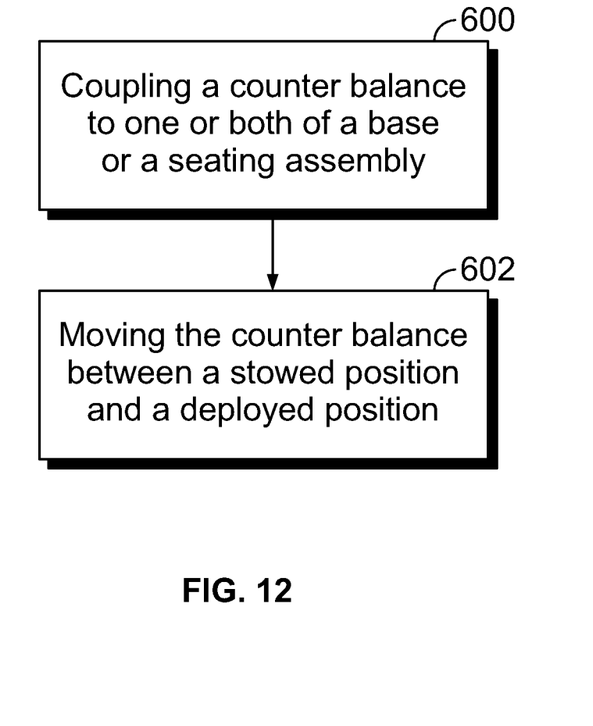
FIG. 12 illustrates a flow chart of a method for transferring an individual between an area and a toilet within a lavatory, according to an embodiment of the present disclosure.

FIG. 12 illustrates a flow chart of a method for transferring an individual between an area and a toilet within a lavatory, according to an embodiment of the present disclosure. The method includes coupling, at 600, a counterbalance to one or both of a base or a seating assembly. The seating assembly is coupled to the base. The seating assembly includes a backrest, a toilet overlay seat configured to be disposed over the toilet, and a seat cover that is movable between a covering position over the toilet overlay seat, and a lavatory use position in which the toilet overlay seat is exposed. The method also includes moving, at 602, the counterbalance between a stowed position and a deployed position in relation to the toilet.

In at least one example, the method also includes moving the seating assembly relative to the base. For example, said moving the seating assembly relative to the base includes sliding the seat assembly relative to the base over the toilet.

In at least one example, the method also includes operatively coupling a handle to the counterbalance. The handle is configured to be engaged to move the counterbalance between the stowed position and the deployed position. In at least one embodiment, the method also includes coupling the handle to the counterbalance through a ratchet mechanism. As a further example, the method includes engaging a release button of the handle to release the ratchet mechanism from a locked position. Also, as an example, the method includes selectively engaging a latch to selectively lock and unlock the seating assembly in translated positions.

Further, the disclosure comprises examples according to the following clauses:

Clause 1. A system configured to transfer an individual between an area and a toilet within a lavatory, the system comprising:
a base;
one or more rollers coupled to the base;

a seating assembly coupled to the base, wherein the seating assembly comprises a backrest, a toilet overlay seat configured to be disposed over the toilet, and a seat cover that is movable between a covering position over the toilet overlay seat, and a lavatory use position in which the toilet overlay seat is exposed; and a counterbalance coupled to one or both of the base or the seating assembly, wherein the counterbalance is moveable between a stowed position and a deployed position in relation to the toilet.

Clause 2. The system of Clause 1, wherein the seating assembly is configured to move relative to the base.

Clause 3. The system of Clauses 1 or 2, wherein the seating assembly is configured to rearwardly slide relative to the base over the toilet.

Clause 4. The system of any of Clauses 1-3, wherein the base comprises lateral guide rails that slidably retain one or more portions of the seating assembly.

Clause 5. The system of any of Clauses 1-4, further comprising a handle operatively coupled to the counterbalance, wherein the handle is configured to be engaged to move the counterbalance between the stowed position and the deployed position.

Clause 6. The system of Clause 5, wherein the handle couples to the counterbalance through a ratchet mechanism.

Clause 7. The system of Clause 6, wherein the handle comprises a release button operatively coupled to the ratchet mechanism, and configured to release the ratchet mechanism from a locked position.

Clause 8. The system of any of Clauses 1-7, further comprising a latch configured to be selectively engaged to selectively lock and unlock the seating assembly in translated positions.

Clause 9. The system of any of Clauses 1-8, wherein the counterbalance comprises a first extension beam connected to a second connection beam by a cross beam.

Clause 10. The system of any of Clauses 1-9, wherein at least a portion of the base is configured to magnetically couple to a portion of the lavatory.

Clause 11. The system of any of Clauses 1-10, wherein the base comprises one or more suction cups configured to secure the transfer system in position within the lavatory.

Clause 12. A method for transferring an individual between an area and a toilet within a lavatory, the method comprising:
coupling a counterbalance to one or both of a base or a seating assembly, wherein the seating assembly is coupled to the base, wherein the seating assembly comprises a backrest, a toilet overlay seat configured to be disposed over the toilet, and a seat cover that is movable between a covering position over the toilet overlay seat, and a lavatory use position in which the toilet overlay seat is exposed; and
moving the counterbalance between a stowed position and a deployed position in relation to the toilet.

Clause 13. The method of Clause 12, further comprising moving the seating assembly relative to the base.

Clause 14. The method of Clause 13, wherein said moving the seating assembly relative to the base comprises sliding the seat assembly relative to the base over the toilet.

Clause 15. The method of any of Clauses 12-14, further comprising operatively coupling a handle to the counterbalance, wherein the handle is configured to be engaged to move the counterbalance between the stowed position and the deployed position.

Clause 16. The method of Clause 15, further comprising coupling the handle to the counterbalance through a ratchet mechanism.

Clause 17. The method of Clause 16, further comprising engaging a release button of the handle to release the ratchet mechanism from a locked position.

Clause 18. The method of any of Clauses 12-17, further comprising selectively engaging a latch to selectively lock and unlock the seating assembly in translated positions.

Clause 19. A system configured to transfer an individual between an area and a toilet within a lavatory, the system comprising:
a base including lateral guide rails;
one or more rollers coupled to the base;
a seating assembly coupled to the base, wherein the seating assembly is configured to move relative to the base, wherein the seating assembly comprises a backrest, a toilet overlay seat configured to be disposed over the toilet, and a seat cover that is movable between a covering position over the toilet overlay seat, and a lavatory use position in which the toilet overlay seat is exposed, wherein the lateral guide rails slidably retain one or more portions of the seating assembly;
a latch configured to be selectively engaged to selectively lock and unlock the seating assembly in translated positions;
a counterbalance coupled to one or both of the base or the seating assembly, wherein the counterbalance is moveable between a stowed position and a deployed position in relation to the toilet; and
a handle operatively coupled to the counterbalance, wherein the handle is configured to be engaged to move the counterbalance between the stowed position and the deployed position.

Clause 20. The system of Clause 19, wherein the handle couples to the counterbalance through a ratchet mechanism, wherein the handle comprises a release button operatively coupled to the ratchet mechanism, and configured to release the ratchet mechanism from a locked position.

As described herein, embodiments of the present disclosure provide a system and method for allowing individuals to independently more easily and efficiently use an existing lavatory, such as within an internal cabin of a commercial aircraft. Additionally, embodiments of the present disclosure provide a safe, readily accessible, consistent, independent, and easy-to-use system and method for transferring between different areas within a lavatory.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system configured to transfer an individual between an area and a toilet within a lavatory, the system comprising:
   a base;
   one or more rollers coupled to the base;
   a seating assembly coupled to the base, wherein the seating assembly comprises a backrest, a toilet overlay seat configured to be disposed over the toilet, and a seat cover that is movable between a covering position over the toilet overlay seat, and a lavatory use position in which the toilet overlay seat is exposed; and
   a counterbalance pivotally coupled to one or both of the base or the seating assembly by one or more pivot couplings, wherein the counterbalance is moveable between a stowed position and a deployed position in relation to the toilet, wherein the counterbalance is configured to pivot downwardly about the one or more pivot couplings from the stowed position into the deployed position, and wherein the counterbalance is configured to pivot upwardly about the one or more pivot couplings from the deployed position into the stowed position.

2. The system of claim 1, wherein the seating assembly is configured to move relative to the base.

3. The system of claim 1, wherein the seating assembly is configured to rearwardly slide relative to the base over the toilet.

4. The system of claim 1, wherein the base comprises lateral guide rails that slidably retain one or more portions of the seating assembly.

5. The system of claim 1, further comprising a handle operatively coupled to the counterbalance, wherein the handle is configured to be engaged to move the counterbalance between the stowed position and the deployed position, wherein the handle is configured to pivot upwardly to move the counterbalance from the stowed position into the deployed position, and wherein the handle is configured to pivot downwardly to move the counterbalance from the deployed position into the stowed position.

6. The system of claim 5, wherein the handle couples to the counterbalance through a ratchet mechanism.

7. The system of claim 6, wherein the handle comprises a release button operatively coupled to the ratchet mechanism, and configured to release the ratchet mechanism from a locked position.

8. The system of claim 1, further comprising a latch configured to be selectively engaged to selectively lock and unlock the seating assembly in translated positions.

9. The system of claim 1, wherein the counterbalance comprises a first extension beam connected to a second connection beam by a cross beam, wherein the one more pivot couplings comprise:
   a first pivot coupling pivotally coupled to the first pivot coupling on a first side of the seating assembly; and
   a second pivot coupling pivotally coupled to the second extension beam on a second side of the seating assembly, and wherein the first side is opposite from the second side.

10. The system of claim 1, wherein at least a portion of the base is configured to magnetically couple to a portion of the lavatory.

11. The system of claim 1, wherein the base comprises one or more suction cups configured to secure the transfer system in position within the lavatory.

12. A method for transferring an individual between an area and a toilet within a lavatory, the method comprising:
   pivotally coupling, by one or more pivot couplings, a counterbalance to one or both of a base or a seating assembly, wherein the seating assembly is coupled to the base, wherein the seating assembly comprises a backrest, a toilet overlay seat configured to be disposed over the toilet, and a seat cover that is movable between a covering position over the toilet overlay seat, and a lavatory use position in which the toilet overlay seat is exposed; and
   moving the counterbalance between a stowed position and a deployed position in relation to the toilet, wherein said moving comprises:
      pivoting the counterbalance downwardly about the one or more pivot couplings from the stowed position into the deployed position; and
      pivoting the counterbalance upwardly about the one or more pivot couplings from the deployed position into the stowed position.

13. The method of claim 12, further comprising moving the seating assembly relative to the base.

14. The method of claim 13, wherein said moving the seating assembly relative to the base comprises sliding the seat assembly relative to the base over the toilet.

15. The method of claim 12, further comprising:
   operatively coupling a handle to the counterbalance, wherein the handle is configured to be engaged to move the counterbalance between the stowed position and the deployed position;

pivoting the handle upwardly to move the counterbalance from the stowed position into the deployed position; and pivoting the handle downwardly to move the counterbalance from the deployed position into the stowed position.

16. The method of claim 15, further comprising coupling the handle to the counterbalance through a ratchet mechanism.

17. The method of claim 16, further comprising engaging a release button of the handle to release the ratchet mechanism from a locked position.

18. The method of claim 12, further comprising selectively engaging a latch to selectively lock and unlock the seating assembly in translated positions.

19. A system configured to transfer an individual between an area and a toilet within a lavatory, the system comprising:
a base including lateral guide rails;
one or more rollers coupled to the base;
a seating assembly coupled to the base, wherein the seating assembly is configured to move relative to the base, wherein the seating assembly comprises a backrest, a toilet overlay seat configured to be disposed over the toilet, and a seat cover that is movable between a covering position over the toilet overlay seat, and a lavatory use position in which the toilet overlay seat is exposed, wherein the lateral guide rails slidably retain one or more portions of the seating assembly;
a latch configured to be selectively engaged to selectively lock and unlock the seating assembly in translated positions;
a counterbalance pivotally coupled to one or both of the base or the seating assembly by one or more pivot couplings, wherein the counterbalance is moveable between a stowed position and a deployed position in relation to the toilet, wherein the counterbalance is configured to pivot downwardly about the one or more pivot couplings from the stowed position into the deployed position, and wherein the counterbalance is configured to pivot upwardly about the one or more pivot couplings from the deployed position into the stowed position; and
a handle operatively coupled to the counterbalance, wherein the handle is configured to be engaged to move the counterbalance between the stowed position and the deployed position, wherein the handle is configured to pivot upwardly to move the counterbalance from the stowed position into the deployed position, and wherein the handle is configured to pivot downwardly to move the counterbalance from the deployed position into the stowed position.

20. The system of claim 19, wherein the handle couples to the counterbalance through a ratchet mechanism, wherein the handle comprises a release button operatively coupled to the ratchet mechanism, and configured to release the ratchet mechanism from a locked position.

* * * * *